(12) United States Patent
Choi (10) Patent No.: US 12,181,295 B2
(45) Date of Patent: Dec. 31, 2024

(54) HAZARD GUIDANCE METHOD OF DRIVING ROUTE AND SERVER PROVIDING THE SAME

(71) Applicants: HYUNDAI MOTOR COMPANY, Seoul (KR); KIA CORPORATION, Seoul (KR)

(72) Inventor: Byoungil Choi, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 238 days.

(21) Appl. No.: 17/741,697

(22) Filed: May 11, 2022

(65) Prior Publication Data
US 2023/0053577 A1 Feb. 23, 2023

(30) Foreign Application Priority Data
Aug. 23, 2021 (KR) .................. 10-2021-0111211

(51) Int. Cl.
*G01C 21/34* (2006.01)
(52) U.S. Cl.
CPC ..... *G01C 21/3461* (2013.01); *G01C 21/3484* (2013.01)
(58) Field of Classification Search
CPC ............ G01C 21/3461; G01C 21/3484; G01C 21/3697; G01C 21/3617; G01C 21/362; G06Q 50/40
See application file for complete search history.

(56) References Cited

U.S. PATENT DOCUMENTS

| | | | |
|---|---|---|---|
| 2004/0189512 A1* | 9/2004 | Takashima | G01S 13/931 342/55 |
| 2012/0310534 A1* | 12/2012 | Mizuno | G01C 21/3617 701/540 |
| 2014/0025296 A1* | 1/2014 | Shimizu | G01C 21/3617 701/533 |
| 2014/0058672 A1* | 2/2014 | Wansley | G08G 1/096827 701/540 |
| 2017/0146351 A1* | 5/2017 | Von Cavallar | G06F 16/288 |
| 2018/0196421 A1* | 7/2018 | Carlhoff | G05D 1/0038 |
| 2019/0318159 A1* | 10/2019 | Blanc-Paques | B60R 25/25 |
| 2020/0318986 A1* | 10/2020 | Nara | G01C 21/3484 |
| 2021/0042772 A1* | 2/2021 | Liu | G06N 20/00 |

* cited by examiner

*Primary Examiner* — Keith D Bloomquist
(74) *Attorney, Agent, or Firm* — MCDONNELL BOEHNEN HULBERT & BERGHOFF LLP (57) ABSTRACT

A method for predicting a hazard element on a driving route for a personal mobility device, and guiding the predicted hazard element on the driving route to a customer is provided A hazard element guide server includes a server communication unit that communicates with a customer terminal possessed by a first customer, and receives an application message including information on at least one of a first departure point and a first driving time for use of a first personal mobility. A server controller extracts a first historical driving record corresponding to at least one of a second departure point positioned within a predetermined radius, and estimates a destination included in the extracted first historical driving record as a final destination, and the server controller guides the first customer away from a hazard element that is predicted on a first driving route from the first departure point to the final destination.

16 Claims, 7 Drawing Sheets

HAZARD GUIDANCE METHOD OF DRIVING ROUTE AND SERVER PROVIDING THE SAME

CROSS REFERENCE TO RELATED APPLICATIONS

This application claims priority to and the benefit of Korean Patent Application No. 10-2021-0111211 filed in the Korean Intellectual Property Office on Aug. 23, 2021, the entire contents of which are incorporated herein by reference.

TECHNICAL FIELD

The present disclosure relates to a method for guiding a customer away from a hazardous element on a driving route on a personal mobility device.

BACKGROUND

A personal mobility device is a means of transportation for one person powered by electricity. For example, the personal mobility device includes electric wheels (self-balancing scooters, hoverboards), electric kickboards, electric skateboards, electric bicycles, electric motorcycles (and scooters), and the like.

Recently, as the personal mobility device is combined with the concept of the sharing economy, many people are using personal mobility devices. Domestically, companies starting the shared-type electric kickboard business are increasing mainly in large cities, and the business is expanding nationwide.

Meanwhile, as the spread of personal mobility devices such as electric kickboards and the use of personal mobility devices increase, various types of accidents are also increasing. In particular, with the revision of the law, teenagers can freely use electric kickboards, and thus there is a need to prepare for the safety of personal mobility devices.

The above information disclosed in this Background section is only for enhancement of understanding of the background of the disclosure, and therefore it may contain information that does not form the prior art that is already known in this country to a person of ordinary skill in the art.

SUMMARY

The present disclosure is to provide a method for predicting a hazard element on a driving route that a personal mobility device will move in advance, and guiding the predicted hazard element on the driving route to a customer, and a server that provides the method.

The present disclosure is to provide a hazard element guide method for recommending an optimal destination to a customer, even if the customer is a new customer as well as an existing customer, and a server providing the method.

The hazard element guide server according to one feature of the present disclosure includes a server communication unit that communicates with a customer terminal possessed by a first customer, and receives an application message including information on at least one of a first departure point and a first driving time for use of a first personal mobility device, and a server controller that extracts a first historical driving record corresponding to at least one of a second departure point positioned within a predetermined radius with respect to the first departure point and a second driving time included within a predetermined time range before and after the first driving time from historical driving records for the first customer, and estimates a destination included in the extracted first historical driving record as a final destination, and wherein the server controller guides the first customer away from a hazard element that is predicted on a first driving route from the first departure point to the final destination.

A hazard element guiding method according to another feature of the present disclosure includes a use application for receiving an application message that includes information on at least one of a first departure point and a first driving time for use of a first personal mobility device from a customer terminal possessed by a first customer, destination estimating for extracting a first historical driving record corresponding to at least one of a second departure point positioned within a predetermined radius with respect to the first departure point and a second driving time included within a predetermined time range before and after the first driving time from historical driving records for the first customer, and estimating a destination included in the extracted first historical driving record as a final destination, and first hazard element guiding for guiding the first customer away from a hazard element that is predicted on a first driving route from the first departure point to the final destination.

According to the present disclosure, before the personal mobility is operated, the customer is first informed of the hazard element for the entire section on the driving route, and the hazard element for the front section predetermined in real-time is provided to the customer while the personal mobility device is in operation. By guiding the personal mobility device, it is possible to prevent the occurrence of a safety accident by allowing the customer to sufficiently recognize the hazard element.

According to the present disclosure, inconvenience of the customer inputting information about the destination in detail can be reduced by recommending the optimal destination to the customer.

DETAILED DESCRIPTION

Hereinafter, referring to the drawings, embodiments disclosed in the present specification will be described in detail, but the same or similar constituent elements are given the same and similar reference numerals, and overlapping descriptions thereof will be omitted. The suffixes "module" and/or "-portion" for the constituent element used in the following description are given or mixed in consideration of only the ease of specification writing, and do not have distinct meanings or roles by themselves. In addition, in describing the embodiment disclosed in the present specification, when it is determined that a detailed description of a related known technology may obscure the gist of the embodiment disclosed in this specification, the detailed description is omitted. In addition, the attached drawings are only for easy understanding of the embodiment disclosed in the present specification, and the technical idea disclosed in this specification is not limited by the attached drawings, and all changes included in the spirit and technical range of the present disclosure should be understood to include equivalents or substitutes.

Terms including ordinal numbers such as first, second, and the like may be used to describe various configurations elements, but the constituent elements are not limited by the terms. The terms are used only for the purpose of distinguishing one constituent element from another constituent element.

When it is mentioned that a certain constituent element is "connected to" or "linked to" another constituent element, it may be directly connected or linked to the other constituent element, but it is understood that another constituent element may exist in between. On the other hand, when it is mentioned that a certain constituent element is "directly connected to" or "directly linked to" another constituent element, it should be understood that another constituent element does not exist in between. In the present application, terms such as "comprise" or "have" are intended to designate that a feature, number, step, operation, constituent element, part, or combination thereof described in the specification exists, and it should be understood as not precluding the possibility of the presence or addition of and one or more other features, numbers, steps, actions, constituent elements, parts, or combinations thereof.

Figure 1:
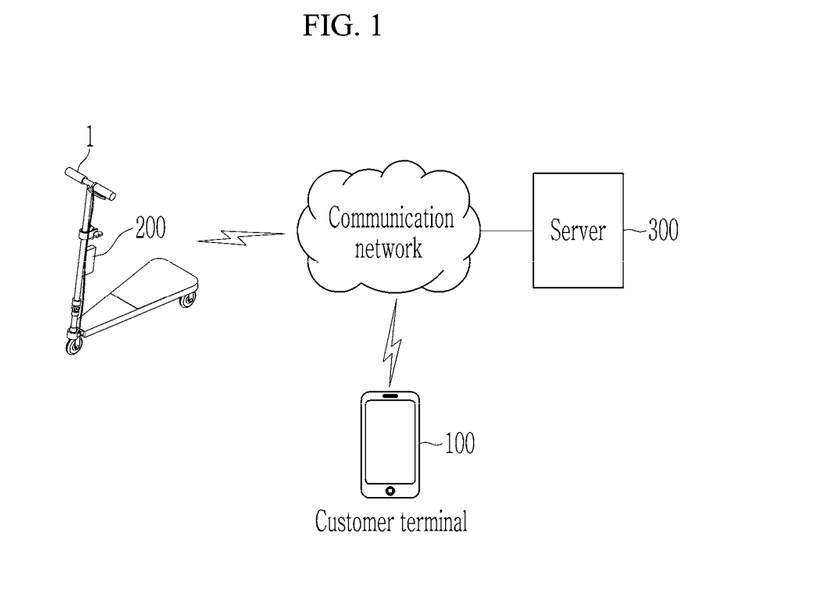
FIG. 1 is provided to describe a hazard element guidance system that guides a customer to a hazard element on a driving route according to an embodiment.
Figure 2:
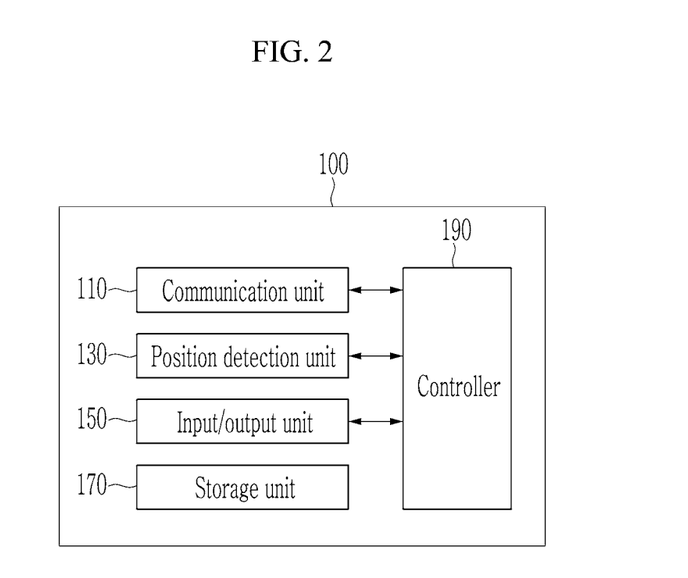
FIG. 2 is a block diagram for description of a function of a customer terminal of FIG. 1.
Figure 3:
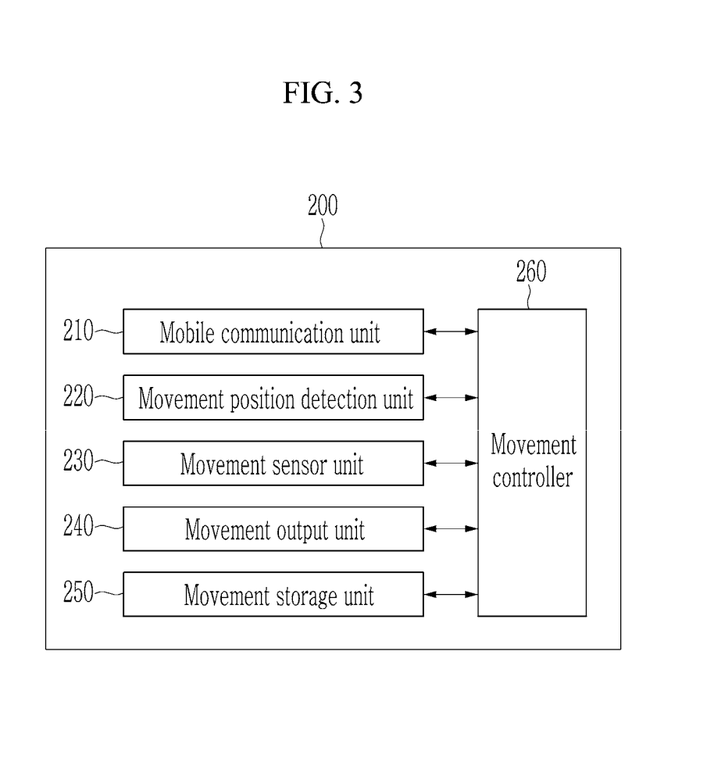
FIG. 3 is a block diagram for description of a mobile terminal installed in a personal mobility device of FIG. 1.
Figure 4:
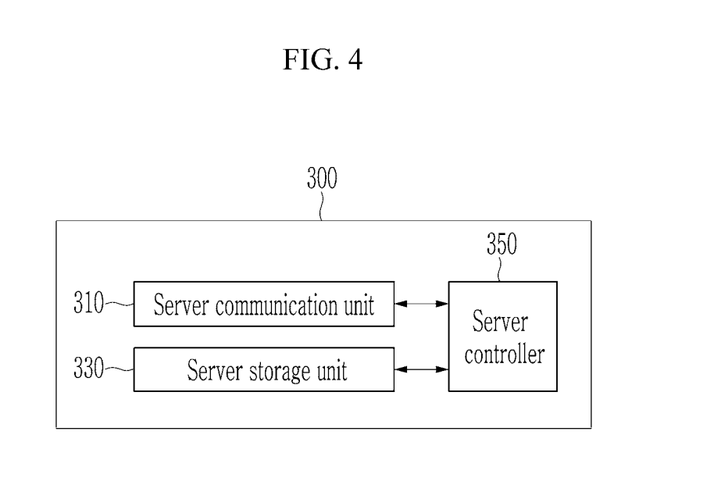
FIG. 4 is provided for description of a server that guides a hazard element on the driving route of FIG. 1.

FIG. 1 is provided to describe a hazard element guidance system that guides a customer to a hazard element on a driving route according to an embodiment, FIG. 2 is a block diagram for description of a function of a customer terminal of FIG. 1, FIG. 3 is a block diagram for description of a mobile terminal installed in an personal mobility of FIG. 1, and FIG. 4 is provided for description of a server that guides a hazard element on the driving route of FIG. 1.

Referring to FIG. 1, a hazard guidance system includes a customer terminal 100, a mobile terminal 200, and a server 300.

The customer terminal 100 may be a terminal possessed by a customer who subscribes to a personal mobility service. The personal mobility service may be a service for renting personal mobility device 1, such as a motorized scooter, to a customer such that the customer can move to a desired destination. According to the embodiment, the personal mobility service may include a service that guides a first customer of hazard elements predicted on a first driving route from a first departure point to a final destination.

In FIG. 1, the customer terminal 100 is shown as a smart phone, but is not limited thereto. For example, the customer terminal 100 may include a desktop PC, a tablet PC, a slate PC, a laptop computer (i.e., notebook computer), a digital broadcasting terminal, a personal digital assistant (PDA), a portable multimedia player (PMP), a navigation device, a digital external camera, an MPEG layer 3 player (MP3P), and the like. In addition, it is natural that the terminal applicable to the customer terminal 100 is not limited to the above-described type, and may include all terminals capable of communicating with an external device.

Referring to FIG. 2, the customer terminal 100 includes a communication unit 110, a position detection unit 130, an input/output unit 150, a storage unit 170, and a controller 190.

The communication unit 110 is connected to a communication network and may transmit/receive data with the server 300. The communication unit 110 may be connected to the communication network through a wireless communication protocol such as a GSM/3GPP series communication method (GSM, HSDPA, LTE advanced), a 3GPP2 series communication method (CDMA, etc.), or WiMAX, but is not limited thereto. For example, the communication unit 110 may be connected to the communication network through a conventional communication protocol or a communication protocol to be developed according to the development of a technology to be developed.

The position detection unit 130 may detect a position of the customer terminal 100. For example, the position detection unit 130 may detect the position of the customer terminal 100 based on a global positioning system (GPS) signal transmitted from a GPS satellite, but is not limited thereto. As another example, the position detection unit 130 may communicate with a plurality of base stations to detect the position of the customer terminal 100. In addition, the position detection unit 130 may detect the position of the customer terminal 100 using not only the conventional position detection method, but also another position detection method to be provided with a technology to be developed later.

The input/output unit 150 displays various information required for the personal mobility service to the customer, and receives various inputs from the user. Specifically, the input/output unit 150 displays an input interface that can input information on the first destination recommended by the server 300 and information on the second destination specifically designated by the customer, and selects the first destination or receives information about the second destination from the customer. In addition, the input/output unit 150 may display a first hazard element predicted on a first driving route before driving of the personal mobility device 1.

For displaying of the above-described information, the input/output unit 150, may include, for example, display means such as a plasma display panel (PDP), a liquid crystal display (LCD) panel, a light emitting diode (LED) panel, an organic light emitting diode (OLED) panel, an active-matrix organic light-emitting diode (AMOLED) panel, and the like.

The input/output unit 150 may include, for example, a button input means such as a keypad, a push button, a membrane button, and the like, and a touch input means such as a touch pad and the like for receiving information from a customer, and may be implemented in the form of a touch screen where both input/output are possible.

The storage unit 170 may store data, algorithms, and the like required for the customer terminal 100 to operate. Depending on embodiments, the storage unit 170 may store an application (hereinafter, the app) related to the personal mobility service, the second destination information received from the customer through the input/output unit 150, the position of the customer terminal 100 detected by the position detection unit 130, first hazard elements predicted on the first driving route, and a navigation program that displays the path from the first departure point to the final destination, but is not limited thereto. As another example, various data that the controller 190 transmits/receives with the server 300 through the communication unit 110 may be stored.

The storage unit 170 may include, for example, a storage medium such as a random access memory (RAM), a static random access memory (SRAM), a read-only memory (ROM), a programmable read-only memory (PROM), and an electrically erasable programmable read-only memory (EEPROM).

The controller 190 controls the customer terminal 100 as a whole, and thus may provide the personal mobility service to customers. For example, the controller 190 receives information on the first destination transmitted from the server 300 through the communication unit 110, and displays information on the first destination through the input/output unit 150. In addition, the controller 190 receives various information (e.g., information on the second destination) input from the customer through the input/output unit 150. In addition, the controller 190 may transmit acceptance of the first destination or information on the second destination to the server 300 through the communication unit 110.

The mobile terminal 200 may be a terminal electrically connected to the personal mobility device 1. In FIG. 1, the personal mobility device 1 is illustrated, but the present disclosure is not limited thereto. Depending on embodiments, the personal mobility device 1 may refer to a means of movement for one person that moves by electricity as power. For example, personal mobility devices may include an electric wheel (self-balancing scooter, hoverboard), an electric skateboard (motorized skateboard), an electric bicycle, an electric motorcycle (and scooter), and the like.

Referring to FIG. 3, the mobile terminal 200 includes a mobile communication unit 210, a movement position detection unit 220, a movement sensor unit 230, a movement output unit 240, a movement storage unit 250, and a movement controller 260.

The mobile communication unit 210 is connected to the communication network and may transmit/receive data with the server 300. The communication unit 110 may be connected to a communication network through various wireless communication protocols, but is not limited thereto. For example, the mobile communication unit 210 may be connected to a communication network through a conventional communication protocol or a communication protocol to be developed according to future technology development.

The movement position detection unit 220 may detect a position of the mobile terminal 200, that is, the personal mobility device 1. For example, the movement position detection unit 220 may detect the position of the mobile terminal 200 based on the GPS signal, but is not limited thereto. For another example, the movement position detection unit 220 may communicate with a plurality of base stations to detect the position of the mobile terminal 200.

The movement sensor unit 230 may include a speed sensor, an acceleration sensor, and the like, and thus may measure a speed and acceleration of the personal mobility device 1. Depending on embodiments, the movement controller 260 may include information about the speed and acceleration measured values of the personal mobility device 1 in a second response message when generating the second response message, which is a response to a second hazard element to be described below.

The movement output unit 240 may include a speaker and the like and thus may output a voice message. Depending on embodiments, the movement controller 260 may convert the information on the second hazard element received from the server 300 into a voice message and transmit it to the customer through the movement output unit 240.

The movement storage unit 250 may store various data and algorithms necessary for the mobile terminal 200 to operate. Depending on embodiments, the movement storage unit 250 may store an application (hereinafter, an app) related to the personal mobility service, the position of the mobile terminal 200 detected by the movement position detection unit 220, and the like, but is not limited thereto. As another example, various data transmitted/received by the movement controller 260 with the server 300 through the mobile communication unit 210 may be stored.

The movement controller 260 may provide a personal mobility service to a customer by controlling the mobile terminal 200 as a whole. For example, when receiving a lock signal from the server 300, the movement controller 260 may set a lock to prevent the personal mobility 1 from operating. In addition, when receiving an unlock signal from the server 300, the movement controller 260 may release the lock such that the personal mobility device 1 can be operated.

The server 300 may guide the first customer with the hazard elements predicted on the first driving route from the first departure point to the final destination. In this case, the hazard element may include a first hazard element that guides the customer before driving of personal mobility devices and a second hazard element that guides the customer during driving of a personal mobility device.

The first hazard element may include at least one hazard element predicted on the first driving route. The second hazard element may include a new hazard element that is not included in the first hazard element. Then, the customer can establish countermeasures after recognizing all hazard elements predicted on the first driving route before driving the personal mobility device. In addition, customers can sufficiently respond to future hazards by being informed about new hazard elements that occur in real-time.

Referring to FIG. 4, the server 300 includes a server communication unit 310, a server storage unit 330, and a server controller 350.

The server communication unit 310 may transmit/receive data with each of the customer terminal 100 and the mobile terminal 200 using a communication protocol that can communicate with each of the customer terminal 100 and the mobile terminal 200.

The server storage unit 330 may store various information necessary to provide a hazard guide service of a personal mobility service and a driving route to a customer. For example, the server storage unit 330 may store real-time position information of the personal mobility device 1, personal information of a customer who has subscribed to the personal mobility service, and a historical driving record. For another example, the server storage unit 330 may store hazard elements expected in a predetermined area (e.g., all of Seoul, Gangnam-gu, Seocho-gu, etc.). The hazard elements may be provided by an external organization or may be collected by itself. More details will be described with reference to FIG. 5 to FIG. 9.

When the server controller 350 receives a customer's request for use of the personal mobility device 1, the server controller 350 may recommend a destination before the customer inputs the destination. When the destination is determined by specifying a recommended destination or a specific destination by the customer, the server controller 350 informs the customer of expected hazard elements from a departure point to the destination before the electric scooter 1 is operated. In addition, the server controller 350 may check the hazard elements that may occur in real-time while the personal mobility device 1 is in operation and inform the customer about new hazard elements secondarily. More details will be described hereinafter with reference to FIG. 5 to FIG. 9.

Figure 5:
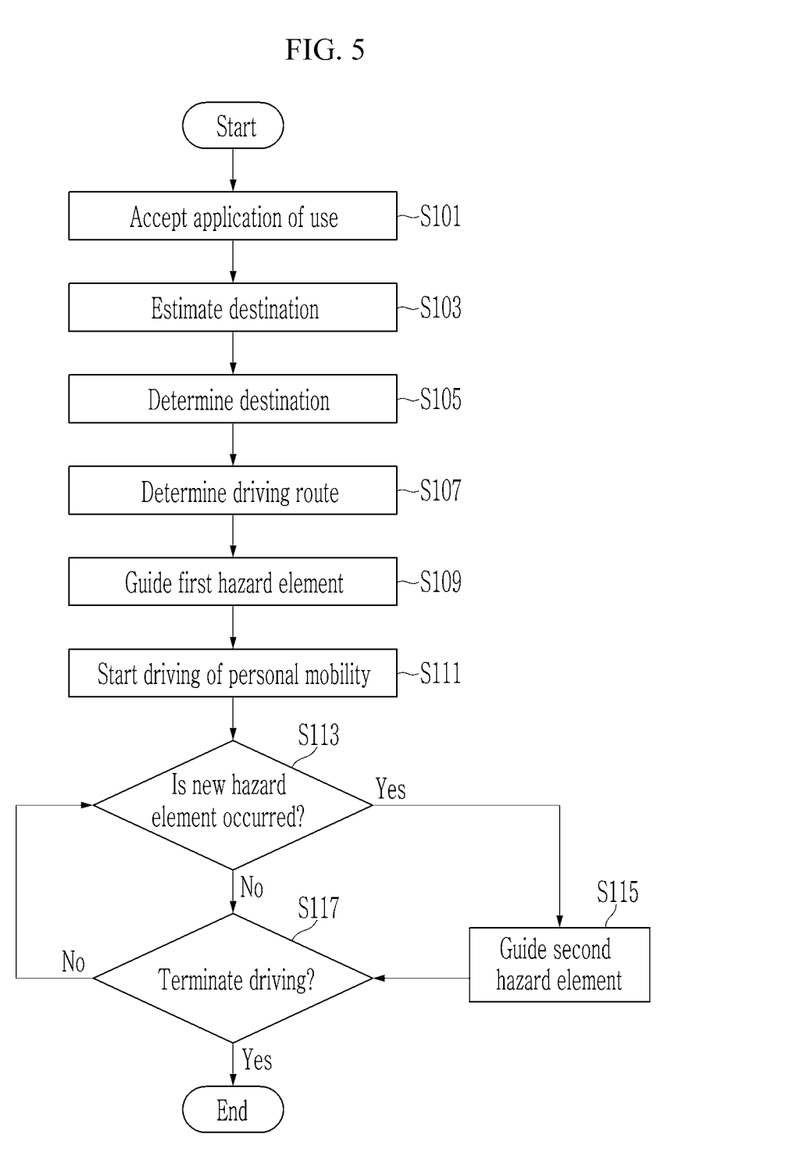
FIG. 5 is a flowchart for description of a hazard element guiding method for informing a customer of hazard elements on a driving route according to an embodiment.
Figure 6:
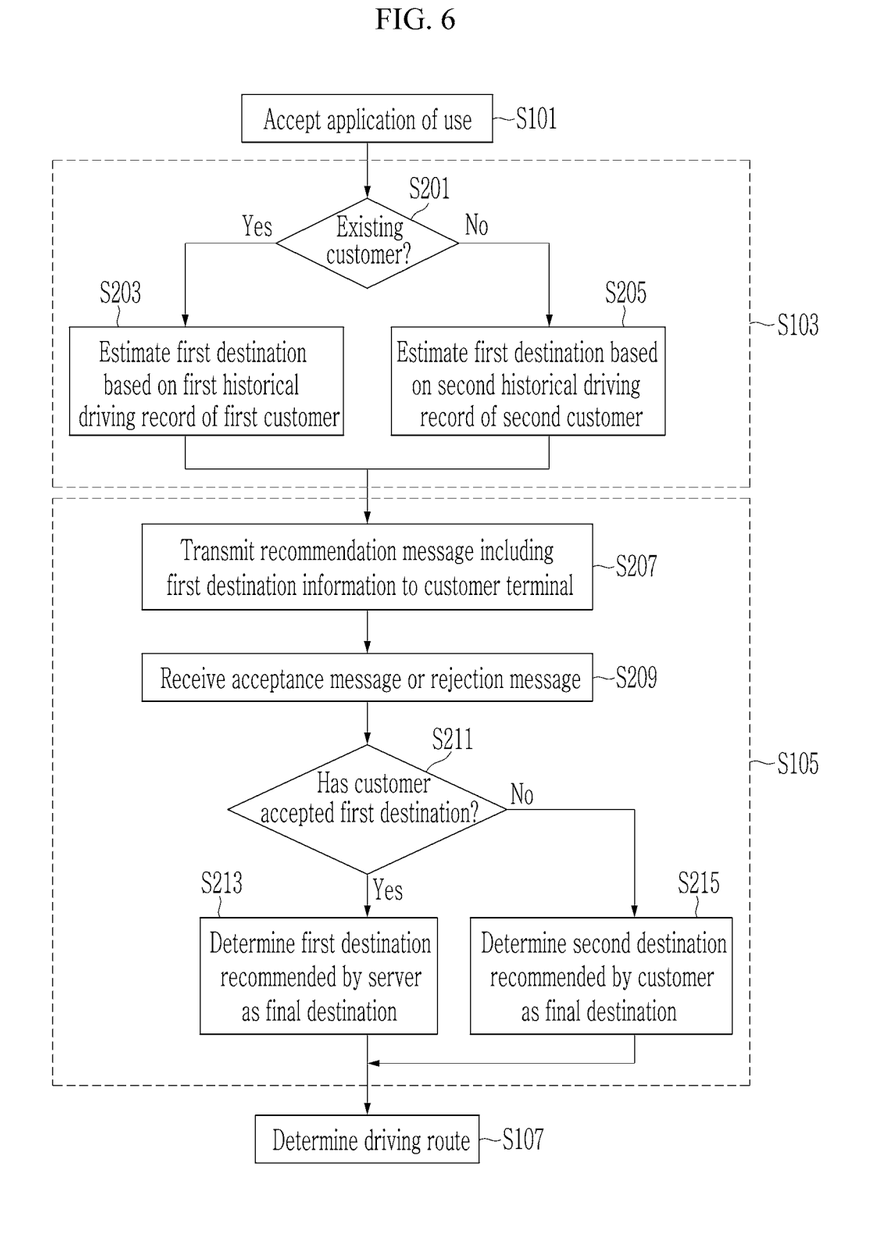
FIG. 6 is provided for detailed description of destination estimation and destination determination of FIG. 5.
Figure 7:
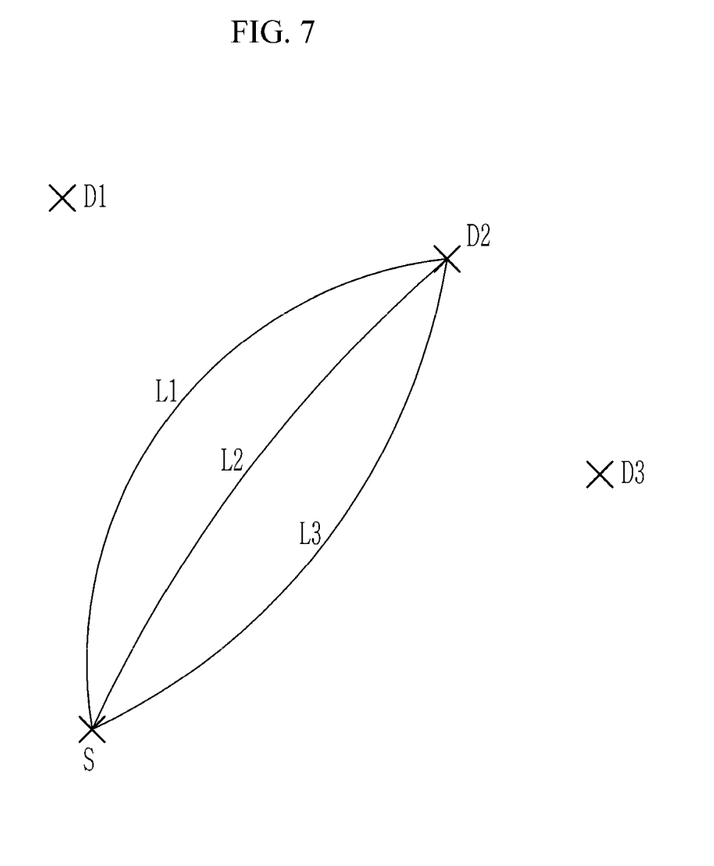
FIG. 7 is an exemplary illustration for description of driving route determination of FIG. 5.
Figure 8:
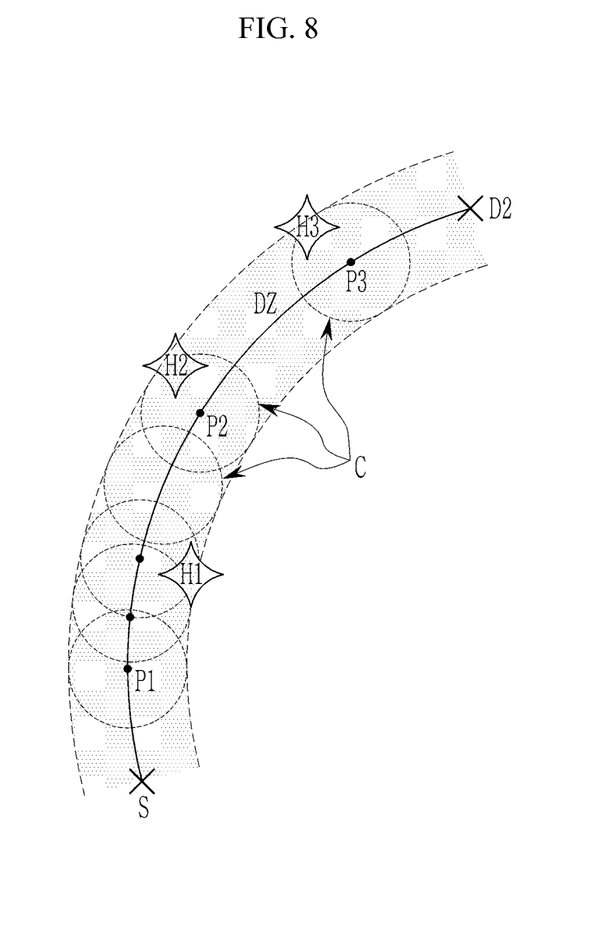
FIG. 8 is an example for description of guiding of a first hazard element of FIG. 5.
Figure 9:
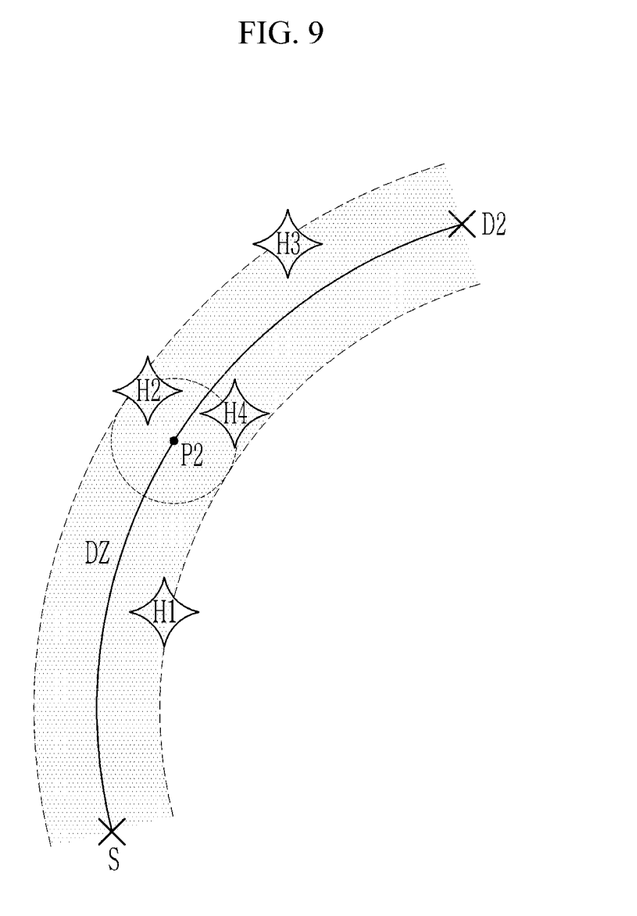
FIG. 9 is an exemplary illustration for description of determination of new hazard element and guiding of second hazard element of FIG. 5.

FIG. 5 is a flowchart for description of a hazard element guiding method for informing a customer of hazard elements on a driving route according to an embodiment, FIG. 6 is provided for detailed description of destination estimation and destination determination of FIG. 5, FIG. 7 is an exemplary illustration for description of driving route determination of FIG. 5, FIG. 8 is an exemplary illustration for description of guiding of a first hazard element of FIG. 5, and FIG. 9 is an exemplary illustration for description of determination of new hazard element and guiding of second hazard element of FIG. 5.

Referring to FIG. 5, the server controller 350 receives an application message for approval of use of the personal mobility device 1 from the customer terminal 100 possessed by the first customer through the server communication unit 310 at S101.

The server controller 350 determines whether the customer who has transmitted the application message through the customer terminal 100 is a customer who has subscribed to the electric scooter service (i.e., a motorized scooter service). When the customer does not subscribe to the personal mobility service, the server controller 350 may transmit a message requesting subscription to the personal mobility service to the customer terminal 100 through the server communication unit 310. For example, the server controller 350 may collect personal information such as an age and occupation of a customer and store the collected personal information in the server storage unit 330 in the subscription phase of the personal mobility service.

The application message may include information about at least one of a first departure point and a first operating time. The first departure point may be a departure point designated by the first customer. In addition, information on the first departure point may include position information of the first departure point. For example, the first departure point may be a location where the first customer receives the electric scooter 1 or a location where the electric scooter 1 starts operating. The first operating time may be a time designated by the first customer for use of the electric scooter 1. For example, the first operating time may be a time at which the personal mobility device 1 starts operating.

Next, the server 300 estimates the first destination based on the position of the first departure point, the first operation time, and a plurality of conventional operation records at S103. In addition, the server 300 determines the estimated first destination or a second destination transmitted by the first customer through the customer terminal 100 as the final destination at S105.

Depending on embodiments, the server controller 350 may estimate the first destination, which is a destination predicted to be designated by the first customer, and recommend the estimated first destination to the first customer as the final destination. The first customer may confirm the final destination by accepting the recommended first destination. When the recommended first destination is not the destination desired by the first customer, the first customer may transmit information on the second destination, which is the desired destination, to the server 300 through the customer terminal 100. Then, it is possible to reduce the inconvenience of the first customer to specifically input the position of the destination at the initial stage of applying for the personal mobility service. In addition, the first customer may input a destination other than the recommended destination.

Hereinafter, the estimation of the destination at S103 and the confirmation of the final destination at S105 will be described in detail with reference to FIG. 6.

Referring FIG. 6, in S103, the server controller 350 determines whether the first customer is an existing customer or a new customer at S201.

Depending on embodiments, the existing customer may be a customer whose first historical driving record is stored in at least one server storage unit 330. The new customer may be a customer whose historical driving record is not stored in the server storage unit 330. That is, the server controller 350 may classify the first customer as an existing customer or a new customer based on whether the first customer has operated the electric scooter 1 before. For example, although the customer is a customer who has subscribed to the personal mobility service, the customer may be a new customer when the customer has never operated the conventional personal mobility device 1 and thus the corresponding historical driving record is not stored in the server storage unit 330.

The historical driving record may be generated corresponding to each of the driving times of the personal mobility device 1. For example, when the customer starts the operation of the electric scooter 1 at the departure point and ends the operation of the personal mobility device 1 at the destination, which is the final destination, the server controller 350 may generate a historical driving record corresponding to one time. Depending on embodiments, the historical driving record may include departure point information, destination information, operating time information, and personal information of a customer who has operated the personal mobility device 1. In this case, the customer's personal information may include customer's age information and occupation information.

A first historical driving record may be a historical driving record for the first customer. A second historical driving record may be a historical driving record for the second customer. In this case, the first customer may be a customer who has transmitted an application message to the server 300 through the customer terminal 100. The second customer may be a customer other than the first customer among a plurality of customers who have subscribed to the personal mobility service.

In S103, when it is determined that the first customer is an existing customer (S201, Yes), the server controller 350 estimates a first destination based on the first historical driving record of the first customer at S203.

Depending on embodiments, the server controller 350 may extract a first historical driving record corresponding to at least one of a second departure point and a second driving time among a plurality of first historical driving records stored in the server storage unit 330. In addition, the server controller 350 may estimate the destination included in the extracted first historical driving record as the first destination.

The second departure point may be a departure point positioned within a predetermined radius based on the first departure point. For example, when the first departure point is Gangnam station exit 1, the server controller 350 may determine the departure location positioned within a 100-meter radius around Gangnam station exit 1 as the second departure point. However, the second starting point is not limited to a 100-meter radius around the first departure point, and the server controller 350 may set various radiuses such as a 50-meter radius, a 30-meter radius, or a 10-meter radius around the first departure point.

The second running time may be a running time belonging to a predetermined time range before and after the first running time. For example, when the first running time is 2:30 pm, the server controller 350 may determine a running time belonging to a time range from a time of 30 minutes before 2:30 pm (2 pm) to a time of 30 minutes after 2:30 pm (3 pm) as a second running time. However, the second running time is not limited to the time range of 30 minutes before and after the first running time, and the server controller 350 can set various time ranges such as 20 minutes before and after or 10 minutes before and after based on the first running time.

Depending on embodiments, the server controller 350 may extract the first historical driving record including the second departure point and the second driving time from the server storage unit 330. For example, when a first conventional running record including the second departure point and second running time is plural, the server controller 350 estimates the destination with the largest number of overlaps among destinations included in the plurality of first conventional running records as the first destination.

For example, referring to FIG. 7, when the first historical driving record including the second departure point and the second driving time is 7 times, and among the destinations included in the first historical driving record corresponding to each of the 7 times, the National Tax Service D1 is 2 times, Kyobo Bookstore D2 is 4 times, and Kukkiwon D3 is one time, the server controller 350 may estimate Kyobo Bookstore D2 as the first destination.

In S103, when it is determined that the first customer is a new customer (S201, No), the server controller 350 estimates the first destination based on the second historical driving record for a second customer who is similar in age and occupation to the first customer at S205.

Depending on embodiments, the server controller 350 may extract a second historical driving record corresponding to a second departure point, a second driving time, a second age, and a second occupation among a plurality of second historical driving records stored in the server storage unit 330. In addition, the server controller 350 may estimate the destination included in the extracted second historical driving record as the first destination.

The second age may be an age included in a predetermined age range younger and older that the first age of the first customer. For example, when the first age is 16 years old, the server 300 may determine an age included in an age range (from 14 years old to 18 years old) from 2 years before (younger than) (e.g., 14 years old) 16 years old to 2 years (older) than 16 years old (e.g., 18 years old) as the second age. However, the predetermined age range for determining the second age is not limited to the age range of 2 years younger and older based on the first age, and the server 300 may set various age ranges such as 1 year older, 3 years older, or 4 years old younger and older than the first age.

The second occupation may be one of a plurality of occupations included in a similar occupation group to which the first occupation of the first customer belongs. For example, when generating a plurality of similar occupation groups according to a predetermined classification criterion to classify a plurality of occupations among similar occupations, the similar occupation group to which the first occupation belongs may be one of a plurality of similar occupation groups. For example, a plurality of similar occupation groups include a student group, an office worker group, a service worker group, a sales worker group, a specialists group, and a machine operation worker group, and it is assumed that the first occupation is a doctor. Then, the doctor who is the first occupation belongs to the specialists group, and a doctor, a lawyer, a patent attorney, or a certified technician included in the specialists group may be the second occupation.

Depending on embodiments, the server controller 350 may extract the second historical driving record including the second departure point, the second driving time, the second age, and the second occupation from the server storage unit 330. For example, when there are a plurality of second historical driving records including a second departure point, a second driving time, a second age, and a second occupation, the server controller 350 estimate the maximum number of duplicates among a plurality of second destinations included in the historical driving record as the first destination.

For example, referring to FIG. 7, when the second historical driving record including the second departure point, the second driving time, the second age, and the second occupation is 15 times, and among destinations included in the first historical driving record corresponding to 15 times, a convenience store D1 is 1 time, a middle school D2 is 13 times, and McDonald's D3 is 1 time, the server controller 350 may estimate the A middle school D2 as the first destination.

In S105, the server controller 350 transmits a recommendation message including information about the first destination to the customer terminal 100 through the server communication unit 310 at S207.

For example, the customer terminal 100 displays an input pop-up window for acceptance of the first destination and inputting the second destination, and receives a response to the recommendation message from the customer. When the customer accepts the recommended first destination, the customer terminal 100 may transmit an acceptance message instructing the customer's acceptance of the first destination to the server 300. Alternatively, when the customer rejects the recommended first destination and inputs position information for the second destination, the customer terminal 100 may transmit a rejection message indicating the customer's rejection to the first destination to the server 300. In this case, the rejection message may include position information for the second destination input by the customer.

In S105, when the server communication unit 310 receives an acceptance message for the first destination or a rejection message including the second destination information as a response to the recommendation message, at S209, the server controller 350 determines whether the customer has accepted the first destination at S211.

In S105, when the server communication unit 310 receives the acceptance message (S211, Yes), the server controller 350 determines that the customer has accepted the first destination, and determines the first destination as the final destination at S213.

In S103, when the server communication unit 310 receives the rejection message (S211, No), the server controller 350 determines that the customer has rejected the first destination, and determines the second destination as the final destination at S215.

Next, the server controller 350 determines the driving route at S107.

Depending on embodiments, the server controller 350 may create a plurality of first driving routes from the first departure point to the final destination. Referring to FIG. 7, the server controller 350 may generate a plurality of first driving routes L1, L2, and L3 from the first departure point S to the final destination D2.

For example, referring to FIG. 7, the server controller 350 may generate the first driving route L1 that crosses a crosswalk with a minimum from the first departure point S to the final destination D2. As another example, the server controller 350 may generate the first driving route L2 corresponding to the shortest distance from the first departure point S to the final destination D2. As another example, the server controller 350 may generate a first route L3 that bypasses environmental obstacles (e.g., hospitals, landfills, funeral homes, and the like) from the first departure point S to the final destination D2 without passing through the environmental obstacles. However, the server controller 350 is not limited to the shortest distance, minimum use of crosswalks, and detours of environmental obstacles, and may generate a plurality of first driving routes according to various criteria.

The server controller 350 may transmit a message including information on the plurality of first driving routes L1, L2, and L3 to the customer terminal 100 through the server communication unit 310. In this case, the customer terminal 100 displays the plurality of first driving routes L1, L2, and L3 on the screen, and receives a response instructing selection of a predetermined first driving route from the customer. The customer terminal 100 may transmit a message including information on the first driving route selected by the customer to the server 300. Then, the server controller 350 may determine the first driving route L1 selected by the customer as the final driving route.

Next, the server controller 350 may transmit a first hazard guide message including information on the first hazard element to the customer terminal 100 through the server communication unit 310 at S109.

The customer terminal 100 displays the first hazard guide message on the screen, and receives an input instructing confirmation of the first hazard element from the first customer. Then, the customer terminal 100 may transmit a first response message instructing the first customer to confirm the first hazard element to the server 300.

The hazard element may be a factor that impairs the driving safety of the personal mobility 1. For example, the hazard elements may include fire, medical care (e.g., outbreak of infectious disease), security (e.g., occurrence of murder), and construction (construction/repair work of roads and buildings, etc.). The server controller 350 may receive the hazard elements expected in a predetermined area (e.g., all of Seoul, Gangnam-gu, Seocho-gu, etc.) from an external organization and store it in the server storage unit 330. Alternatively, the server controller 350 may collect the hazard elements expected in a predetermined area (e.g., all of Seoul, Gangnam-gu, Seocho-gu, etc.) and store them in the server storage unit 330.

The first hazard element may be a hazard element predicted on the first driving route before the personal mobility device 1 is driven. The second hazard element may be a hazard element predicted on the first driving route during the driving of the personal mobility device 1. Depending on embodiments, the second hazard element may include a new hazard element that is not included in the first hazard element. The first hazard guide message may include information on the first hazard elements predicted on the first driving route determined as the final driving route.

For example, the server controller 350 may specify a danger zone DZ, which is an internal area of a predetermined radius, centered on the real-time position of the personal mobility device 1 moving along the first driving route. The server controller 350 may extract at least one hazard element positioned within the danger zone DZ from the server storage unit 330, and determine the extracted hazard element as the first hazard element.

Referring to FIG. 8, for example, the server controller 350 may draw a circle C (i.e., dotted line area) for a predetermined radius centered on real-time positions P1, P2, P3, and the like of the personal mobility device 1 moving along the first driving route. The server controller 350 may connect the circumference of the circle drawn continuously and generate the danger zone DZ that is an area inside the circumference. In addition, the server controller 350 may determine a plurality of hazard elements H1, H2, and H3 positioned in the danger zone DZ as a first danger element.

Next, when the server controller 350 receives the first response message instructing the first customer to confirm the first hazard element from the customer terminal 100 through the server communication unit 310, the server controller 350 transmits an unlock signal of the personal mobility 1 to the mobile terminal 200 installed in the personal mobility device 1 at S111.

The mobile terminal 200 may control a driving unit of the personal mobility device 1 according to the unlock signal to execute an operation mode in which the personal mobility device 1 can be driven. Then, the customer can operate the personal mobility device 1 to start driving.

Next, the server controller 350 determines whether a new second hazard element not included in the first hazard element occurs in real-time or in a predetermined cycle during the driving of the personal mobility device 1 at S113.

Next, when it is determined that the second hazard element occurs (S113, Yes), the server controller 350 transmits a second hazard guide message including information on the second hazard element to the customer terminal 100 and the mobile terminal 200 through the server communication unit 310 at S115.

Referring to FIG. 8 and FIG. 9, when it is determined that a new second hazard element H4 positioned within the danger zone DZ has occurred, the server controller 350 may transmit a second hazard guide message including information on the second hazard element H4 to the customer terminal 100 through the server communication unit 310 and the mobile terminal 200. That is, the second hazard guide message may include information on a new second hazard element generated on the first driving route determined as the final driving route.

The customer terminal 100, for example, may convert the information on the second hazard element into a voice message and transmit the voice message to the first customer. In this case, the first customer may obtain information on the second hazard element without looking at the screen of the customer terminal 100 while driving the personal mobility device 1. Then, it is possible to prevent an accident that may occur if the first customer is careless in front in order to see the screen of the customer terminal 100 while driving the personal mobility device 1.

The mobile terminal 200 may collect position information and speed information of the personal mobility device 1 for a predetermined time before and after receiving the second hazard guide message. The customer terminal 100 may transmit a second response message including the collected position information and speed information of the personal mobility device 1 to the server 300.

Depending on embodiments, the server controller 350 may transmit the second hazard guide message to the customer terminal 100 and the mobile terminal 200 through the server communication unit 310 at predetermined intervals until a second response message is received.

Depending on embodiments, the second hazard guide message may include information that the speed of the personal mobility device 1 decelerates to a predetermined reference value or less. Specifically, for safety while the personal mobility device 1 is in operation, the first customer may drive the personal mobility device 1 to decelerate and transmit to the mobile terminal 200 that it is aware of the second hazard element. Then, the mobile terminal 200 may transmit to the server 300 a second hazard guide message including information that the speed of the personal mobility device 1 has decelerated below a predetermined reference value.

Next, it is determined that the second hazard element does not occur (S113, No), or the server controller 350 determines whether the operation of the personal mobility device 1 is terminated at S117.

When it is determined that the operation is not terminated (S115, No), the server controller 350 continuously determines whether a new second hazard element occurs at S111.

When it is determined that the operation is terminated (S115, Yes), the server controller 350 may transmit an operation termination notification message to the customer terminal 100, and may transmit a lock signal of the personal mobility device 1 to the mobile terminal 200.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

The invention claimed is:

1. A hazard element guiding server comprising:
a server communication unit configured to communicate with a customer terminal possessed by a first customer, and to receive an application message including information on at least one of a first departure point and a first driving time for use of a first personal mobility device; and
a server controller configured to extract a first historical driving record corresponding to at least one of a second departure point positioned within a predetermined radius with respect to the first departure point, and a second driving time included within a predetermined time range before and after the first driving time from historical driving records for the first customer, and to estimate a destination included in the extracted first historical driving record as a final destination;
wherein the server controller guides the first customer with a hazard element that is predicted on a first driving route from the first departure point to the final destination;
wherein the server communication unit transmits a first hazard guide message that includes information on a first hazard element predicted on the first driving route before driving the first personal mobility to the customer terminal;
when receiving a first response message that instructs confirmation of the first customer for the first hazard element from the customer terminal through the server communication unit, the server controller transmits a lock release signal of the first personal mobility device to a mobile terminal installed in the first personal mobility device;
wherein the server controller determines whether a new second hazard element, which is not included in the first hazard element, occurs in real-time or with a predetermined cycle during driving of the first personal mobility; and
wherein the server communication unit transmits a second hazard guide message including information on the second hazard element to the mobile terminal.

2. The hazard element guide server of claim 1, wherein when the extracted first historical driving record comprises a plurality of first historical driving records, the server controller estimates a destination with the largest number of overlaps among destinations included in the plurality of first historical driving records as the final destination.

3. The hazard element guide server of claim 1, wherein when the first customer is a new customer who does not have a historical driving record,
the server controller extracts a second historical driving record corresponding to at least one of the second departure point, the second driving time, a second age belonging to a predetermined age range younger or older than a first age of the first customer based on the first age of the first customer, and a random second occupation among a plurality of occupations included in a similar occupation group in which a first occupation of the first customer is included among historical driving records of a second customer, and estimates a destination included in the extracted second historical driving record as the final destination.

4. The hazard element guide server of claim 3, wherein the similar occupation group is one of a plurality of similar occupation groups generated according to predetermined classification criteria for classification of similar occupations of a pre-defined plurality of occupations.

5. The hazard element guide server of claim 4, wherein when the extracted second historical driving record comprises a plurality of second historical driving records,
the server controller estimates a destination with the largest number of overlaps among destinations included in the plurality of second historical driving records as the final destination.

6. The hazard element guide server of claim 5, wherein the server communication unit transmits a recommendation message that includes information on a first destination, which is the estimated destination, to the customer terminal, and
receives an acceptance message for the first destination or a rejection message including information on a second destination designated by the first customer from the customer terminal, as a response of the recommendation message.

7. The hazard element guide server of claim 6, wherein the server controller determines the first destination as the final destination when receiving the acceptance message, and the server controller determines the second destination as the final destination when receiving the rejection message.

8. The hazard element guide server of claim 1, wherein the server controller transmits the second hazard guide message to the mobile terminal through the server communication unit at predetermined intervals,
until a second response message is received from the mobile terminal through the server communication unit indicating confirmation of the second hazard element from the first customer.

9. The hazard element guide server of claim 8, wherein the second response message includes information that a speed of the first personal mobility device has decelerated below a predetermined reference value.

10. A hazard element guiding method comprising:
  receiving, vis a use application, an application message that includes information on at least one of a first departure point and a first driving time for use of a first personal mobility device from a customer terminal possessed by a first customer;
  estimating a destination by extracting a first historical driving record corresponding to at least one of a second departure point positioned within a predetermined radius with respect to the first departure point, and a second driving time included within a predetermined time range before and after the first driving time from historical driving records for the first customer, and estimating a destination included in the extracted first historical driving record as a final destination; and
  guiding the first customer away from a first hazard element that is predicted on a first driving route from the first departure point to the final destination;
  wherein guiding the first customer away from the first hazard element further comprises:
    personal mobility device driving for transmitting a first hazard guide message including information on a first hazard element predicted on the first driving route before driving the first personal mobility device to the customer terminal; and
    after guiding the first customer away from the first hazard element, transmitting a lock release signal of the first personal mobility to a mobile terminal installed in the first personal mobility when receiving a first response message that instructs confirmation of the first customer for the first hazard element from the customer terminal; and
  further comprising a second hazard element guiding comprising:
    after the personal mobility driving, determining whether the second hazard element, which is not included in the first hazard element in real-time or with a predetermined cycle, occurs during driving of the first personal mobility device; and
    transmitting second hazard element guiding of a second hazard guiding message including information on the second hazard element to the mobile terminal.

11. The hazard element guiding method of claim 10, wherein in the destination estimating, when the extracted first historical driving record comprises a plurality of first driving records, a destination with a largest number of overlaps among destinations included in the plurality of first historical driving records is estimated as the final destination.

12. The hazard element guiding method of claim 10, wherein in the destination estimating, when the first customer is a new customer who does not have the historical driving record, the method further includes extracting a second historical driving record corresponding to at least one of the second departure point, the second driving time, a second age belonging to a predetermined age range younger or older than a first age of the first customer based on the first age of the first customer, and a random second occupation among a plurality of occupations included in a similar occupation group in which a first occupation of the first customer is included among historical driving records of a second customer, and estimating a destination included in the extracted second historical driving record is determined as the final destination.

13. The hazard element guiding method of claim 12, wherein the similar occupation group is one of a plurality of similar occupation groups generated according to predetermined classification criteria for classification of similar occupations of a pre-defined plurality of occupations.

14. The hazard element guiding method of claim 13, wherein in the destination estimating,
  when the second historical driving record comprises a plurality of second historical driving records,
  a destination with the largest number of overlaps among destinations included in the plurality of second historical driving records is estimated as the final destination.

15. The hazard element guiding method of claim 14, further comprising
  after the destination estimating,
  transmitting a recommendation message that includes information on a first destination, which is the estimated destination, to the customer terminal, and
  determining the first destination as the final destination when receiving an acceptance message for the first destination, and determining the second destination as the final destination when receiving a rejection message including information on a second destination designated by the first customer, as a response of the recommendation message.

16. The hazard element guiding method of claim 10, wherein the second response message includes information that a speed of the first personal mobility device has decelerated below a predetermined reference value.

* * * * *